(No Model.)  2 Sheets—Sheet 1.
A. BELUS.
CONSTRUCTION OF VESSELS.
No. 321,569. Patented July 7, 1885.
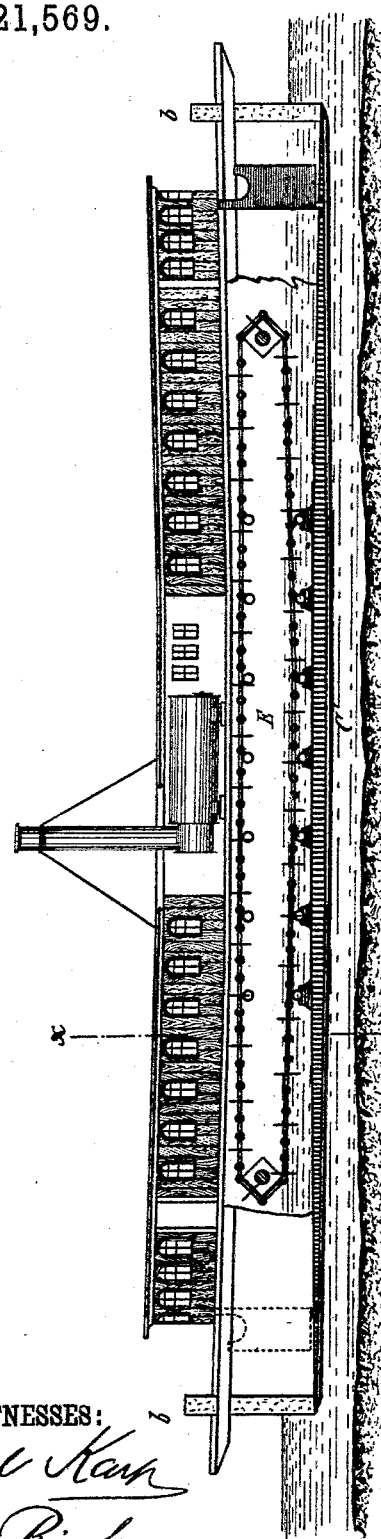
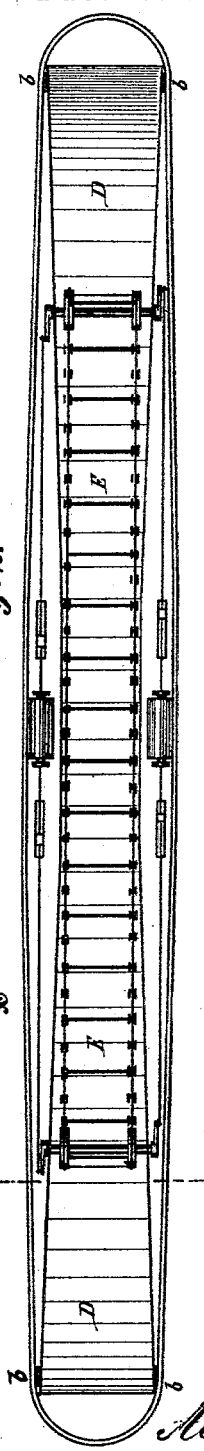
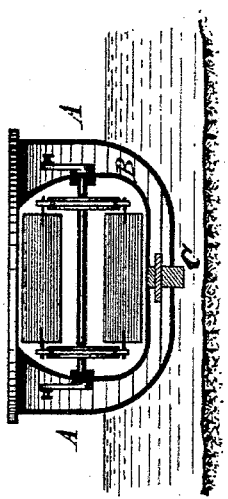
WITNESSES:
Carl Karr
Otto Risch
INVENTOR
Adolf Belus
BY Paul Greger
ATTORNEY

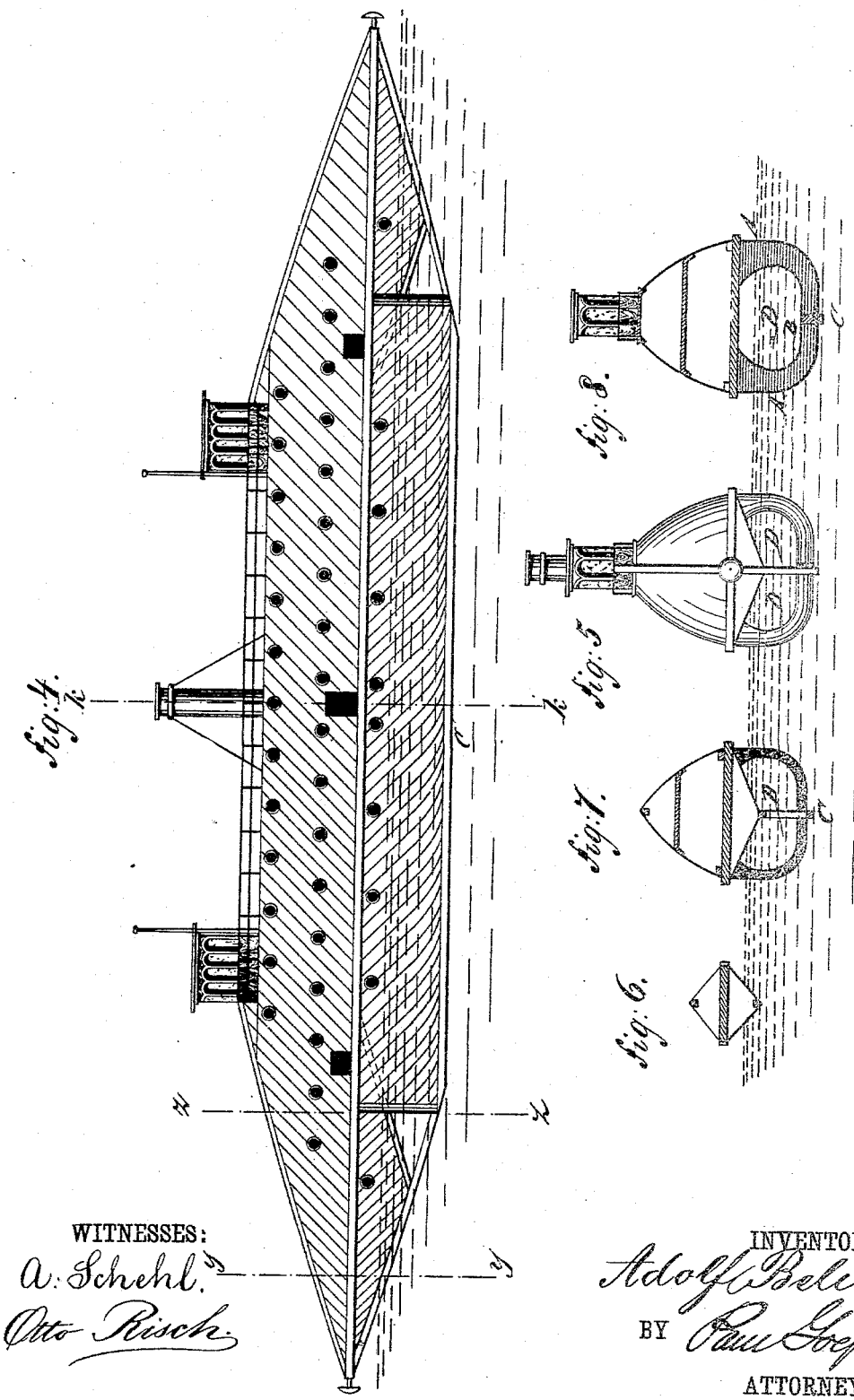

UNITED STATES PATENT OFFICE.

ADOLF BELUS, OF BROOKLYN, NEW YORK.

CONSTRUCTION OF VESSELS.

SPECIFICATION forming part of Letters Patent No. 321,569, dated July 7, 1885.

Application filed February 5, 1883. Renewed March 27, 1885. (No model.)

*To all whom it may concern:*

Be it known that I, ADOLF BELUS, of Brooklyn, in the county of Kings and State of New York, have invented certain new and useful Improvements in the Construction of Vessels, of which the following is a specification.

This invention has reference to an improved construction of vessels for canal, river, and ocean navigation; and it consists of a vessel built of a double hull, the interior hull being open at both ends and constructed in such a manner as to form a longitudinal channel that increases in width and depth from the center toward the ends of the vessel. The vessel is propelled by an endless paddle-chain that is moved through the longitudinal center channel by drums and suitable power.

In the accompanying drawings, Figure 1 represents a side elevation, partly in longitudinal section, of my improved steam-vessel. Fig. 2 is a plan of the same with the deck removed. Fig. 3 is a vertical transverse section on a somewhat larger scale, taken on line $x\ x$, Fig. 1. Fig. 4 is a side elevation of an ocean-steamer built on my improved method. Fig. 5 is an end view of the same; and Figs. 6, 7, and 8 are vertical transverse sections, respectively, on lines $y\ y$, $z\ z$, and $k\ k$, Fig. 4.

Similar letters of reference indicate corresponding parts.

In the drawings, A represents the outer and B the inner hull of my improved steam-vessel. The inner and outer hulls are connected by a common keel and keelson and lateral bracing, and are made open at both ends, so as to form a central longitudinal channel, D, that extends throughout the entire vessel. The inner hull, B, is so constructed that the center channel, D, is narrowest at the middle part of the vessel, but increases gradually in width and depth toward the ends, where it is connected to the other hull, A, by strong posts $b$ $b$, of which one is arranged at each side at the point of connection of the side walls of the inner hull with those of the outer hull. As the width and depth of the center channel gradually decreases from the end toward the middle of the vessel, the body of water that passes through the channel alters its cross-section corresponding to the cross-section of the channel D, and keeps thereby the hulls A and B to a uniform depth in the water. It furnishes, further, when the vessel is in motion through the entire length of the channel, the required depth of water for the paddles or other means of propulsion arranged in the channel, while the water passes finally off through the gradually-enlarging opposite end of the channel without agitating the water to any great extent.

My improved vessel is preferably propelled by means of a paddle-wheel chain, E, of uniform width throughout, which is stretched over suitable rollers and guided by pulleys supported in bearings of both side walls of the inner hull, B, as shown in Fig. 1. The paddle-wheel chain E receives its motion from a steam-engine of suitable power arranged at the middle part of the vessel and connected by suitable transmitting mechanisms with the crank-shafts of the guide-drums. The saloon, cabins, and other accessories are arranged above the deck, while the boilers and coal-bunkers are preferably arranged in the space between the hulls. Rudders are arranged at both ends of the vessel, so that it can be readily moved in one or the opposite direction by simply reversing the direction of motion of the paddle-wheel chain.

The arrangement shown in Figs. 1, 2, and 3 is specially adapted for canal and river navigation. For ocean navigation the form shown in Fig. 4 is to be preferred. In this case a triangular space is left open at the bottom of the bow and stern for the entrance and exit of the water to and from the central longitudinal channel, the bow and stern being pointed so as to pass with great facility through the waves. The method of propulsion is the same as that shown in Figs. 1 and 3; but the upper part of the vessel has a so-called "turtle-back," with a small hurricane back above the same. The space available for cabins, saloons, storage, &c., is thus of ample size. The construction of the deck enables the vessel to pass with great facility through the waves without injury to the interior parts and the propelling mechanisms, which are always protected and accessible in case of repairs, as they are inclosed within the inner hull and the turtle-back deck.

I am aware that endless paddle-wheel chains for propelling vessels are well-known and have been proposed heretofore in many different ways, and I therefore do not lay any claim to this feature. I am also aware that vessels having a central channel passing longitudinally through the entire length of the same have been constructed heretofore for canal navigation; but in these cases the central channel was either open at the bottom or made of uniform width and height throughout, whereby the vessel was not adapted for the severe strains exerted thereon when used for river and ocean navigation.

By arranging the central longitudinal channel in the interior of the double hulls, strength and rigidity are imparted to the vessel, rolling prevented by the steadying action of the body of the water in the channel, and the speed increased by the simultaneous action of a large number of paddles upon the water in the channel.

Having thus described my invention, I claim as new and desire to secure by Letters Patent—

A vessel composed of an exterior and interior hull, including an exterior and interior bottom, forming a space between the hulls for machinery and for storage-room, a longitudinal water-channel above the upper or interior bottom, said channel being at the ends larger than in the center, drums supported in bearings at the ends of the vessel, and a paddle-wheel chain passing over said drums in said channel, substantially as described.

In testimony that I claim the foregoing as my invention I have signed my name in presence of two subscribing witnesses.

A. BELUS.

Witnesses:
PAUL GOEPEL,
SIDNEY MANN.